(No Model.)
M. MUNCHWEILER.
CONVERTIBLE SKID OR TRUCK.
No. 492,416. Patented Feb. 28, 1893.
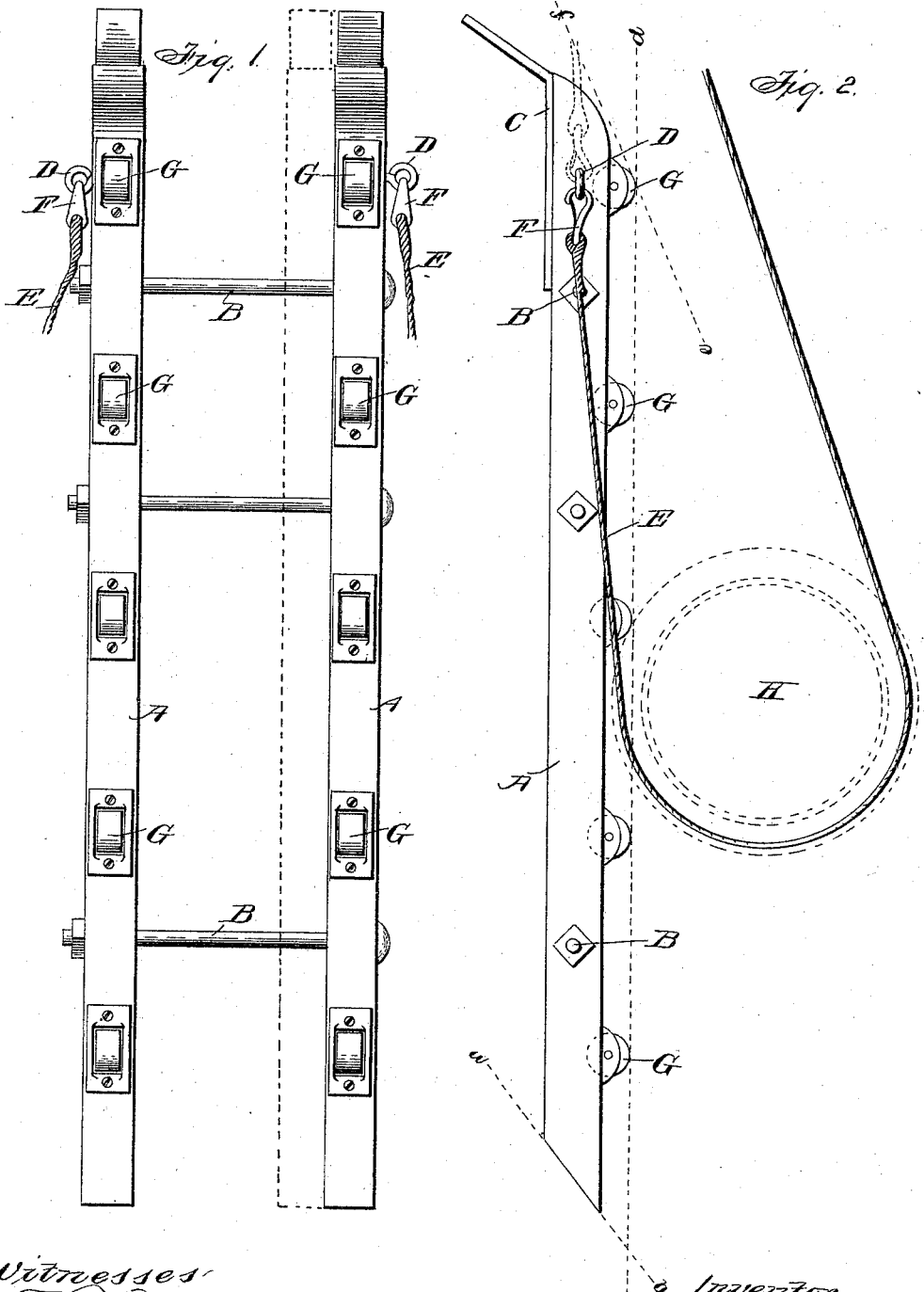
Witnesses
F. R. Cornwall
A. Ramel
Inventor
Maurice Munchweiler
By Paul Bakewell
Atty.

UNITED STATES PATENT OFFICE.

MAURICE MUNCHWEILER, OF ST. LOUIS, MISSOURI.

CONVERTIBLE SKID OR TRUCK.

SPECIFICATION forming part of Letters Patent No. 492,416, dated February 28, 1893.

Application filed September 10, 1892. Serial No. 445,545. (No model.)

*To all whom it may concern:*

Be it known that I, MAURICE MUNCHWEILER, a citizen of the United States, residing in the city of St. Louis and State of Missouri, have invented certain new and useful Improvements in Convertible Skids or Trucks, of which the following is a full, clear, and exact description, reference being had to the accompanying drawings, forming a part thereof.

My invention relates to a convertible skid or truck for handling heavy packages of merchandise, such as boxes, barrels, bales, &c., and is especially adapted for use in loading and unloading the same to and from a wagon, truck, or car, and transporting the packages to some convenient place.

It has for its primary object a device conveniently adapted for use as a skid or truck in practice, and, incidentally thereto, a convenient means for facilitating the loading and unloading of extra heavy packages, when used as a skid; and one adapted to be used as a platform, or as a hand truck for the transumption of packages.

It consists in the combination of a skid and a truck, of the means adapting it for the several uses hereinbefore specified, and in the special features of construction adapting the same to practical application.

In the accompanying drawings, in which like letters of reference denote like parts in the several figures, Figure 1 is a plan-view of my improved skid, and Fig. 2 is a side elevation of the same.

A, A, represent the side timbers, or rails, which are held together by the tie-bolts B, which are, preferably, fitted loosely through holes prepared therefor in the rails A, in order to adjust, within the limit of the length of the bolts B, the distance between the pieces A, to accommodate narrow packages, and, as indicated, in dotted lines, in Fig. 1, to permit their being brought together conveniently for packing the skid. One end of the rails A, is, preferably, beveled off on one side as on the line *a—b*, Fig. 2, corresponding, as nearly as possible, to the base-line of the angle, or ground upon which the skid rests, at which the same is inclined when the other end is supported on a wagon or truck. The other ends, on the opposite side, are rounded off, as indicated in Fig. 2, to facilitate the handling of packages in loading and unloading, by removing the projecting end-pieces. To these latter ends, on the side opposite that which is rounded off, are secured the angle-pieces, or hooks, C, which are preferably inclined at an angle away from the perpendicular to that side of the rails A, for reasons that will appear hereinafter. To this end, also, of the pieces A, are secured screw-eyes D, or similar devices, as a means for the attachment of the ropes E, which are, preferably provided, at their attachment end, with snap-hooks F, or like contrivances, in order that the ropes may be conveniently attached and detached.

To one side of the rails A, is secured a series of rollers, or casters, G, the outer surfaces of which are above the flat surface of the rails A and in line with each other, in order that, when the skid is placed on a flat surface, as *c—d*, Fig. 2, roller-side down, each roller, or caster, G, will bear its proportion of the weight. One roller, at the rounded-off end of each of the rails A, is placed just at the beginning of the curve, the object being two-fold, as hereinafter described.

In Fig. 2, the controlling ropes E are represented as being used to handle a box, or a barrel H, in unloading, so as to keep the box or barrel under control of the operator, as has usually been practiced, heretofore, by attaching one end of the rope to the tail-board, and then lowering the box or barrel on an ordinary board skid. The extended position of the ropes, as shown in dotted lines, represents them as being used to draw the device along, when used as a flat truck.

The main feature of advantage in my improved skid, is in providing one of its flat sides with the rollers G, which will greatly facilitate the handling of heavy articles, especially in loading into a wagon, making use of the ropes E to assist, when needed, in raising the package along the skid, this method being, evidently, decidedly advantageous over the sliding skid in common use. The hooks C, by which the skid is supported at its raised end, are also useful to be inserted under a box or bale, using the skid as a hand truck, as it is readily adapted to be, when tipped up at an angle corresponding to the line *e—f*, Fig. 2.

The second use or advantage of placing a roller G just at the beginning of the curve of the rounded-off end of the rails A, is that, when the device is used as a skid, a box, for instance, can be slid up the roller surface of the skid until it comes to the end of the skid, when it will tip over into the wagon, of its own weight, the box having a roller surface until it is altogether in the wagon into which it is being put.

In instances where it is not desirable to use the ropes E, they can be readily detached from the skid by the snap-hooks F, and used for other purposes.

In practice, it has been found that the principal source of damage in handling such articles with which a skid is used in unloading the same, is the twisting and wrenching of the packages in sliding them down the ordinary skid. This objection is at once obviated in the use of my invention, in which the rollers facilitate the handling of the same to such a degree that they can be moved about with ease. This is particularly true of crates of glass- and queensware.

Other advantages are consequent on the use of my invention; *i. e.*, time and labor are saved.

With my improved skid, fewer men are required for the handling of the same package, and it is loaded or unloaded more quickly, and with less likelihood of breakage.

Having thus described my invention, what I claim, and desire to secure by Letters Patent, is—

The herein-described convertible skid or truck, comprising laterally adjustable side rails, tie bolts for adjusting the rails laterally, rollers arranged along the length of the rails, angle pieces at the ends of the rails, said rails being rounded at the ends having the angle pieces, a set of rollers in the rails near their rounded portions, eyes arranged on the outside of the rails, and hauling ropes detachably secured in the eyes, substantially as described.

In testimony whereof I hereunto affix my signature, in presence of two witnesses, this 6th day of September, 1892.

MAURICE MUNCHWEILER.

Witnesses:
 A. RAMEL,
 F. R. CORNWALL.